United States Patent [19]

Müller

[11] Patent Number: 5,433,125

[45] Date of Patent: Jul. 18, 1995

[54] GEAR SHIFT MECHANISM OF A MOTOR VEHICLE TRANSMISSION

[75] Inventor: Robert Müller, Mönsheim, Germany

[73] Assignee: Ing. h.c.F. Porsche AG, Weissach, Germany

[21] Appl. No.: 102,054

[22] Filed: Aug. 4, 1993

[30] Foreign Application Priority Data

Aug. 29, 1992 [DE] Germany .................. 42 28 797.9

[51] Int. Cl.[6] .................................................. F16H 63/02
[52] U.S. Cl. ............................................ 74/477; 74/335; 192/3.63
[58] Field of Search .......... 74/473 R, 477, 335, 74/339; 192/86, 87.1, 3.57, 3.58, 3.63

[56] References Cited

U.S. PATENT DOCUMENTS

| | | | |
|---|---|---|---|
| 3,229,551 | 1/1966 | Stuckey et al. | 74/477 |
| 4,986,142 | 1/1991 | Borodin et al. | 74/477 X |
| 5,000,060 | 3/1991 | Reynolds et al. | 74/477 X |
| 5,056,632 | 10/1991 | Lemp et al. | 192/3.63 |
| 5,329,826 | 7/1994 | Graves, Jr. et al. | 74/335 |

FOREIGN PATENT DOCUMENTS

| | | |
|---|---|---|
| 82893 | 7/1983 | European Pat. Off. .......... 192/3.63 |
| 2235368 | 10/1973 | Germany . |
| 4205670C1 | 6/1993 | Germany . |
| 780053581 | 1/1980 | Japan . |
| 2054773A | 2/1981 | United Kingdom . |
| 2057607A | 4/1981 | United Kingdom . |

*Primary Examiner*—Dirk Wright
*Assistant Examiner*—Khoi Q. Ta
*Attorney, Agent, or Firm*—Evenson, McKeown, Edwards & Lenahan

[57] ABSTRACT

A gear shift mechanism of a change speed gearbox is provided that is constructed as an auxiliary transmission, in which all the transmission gears can be shifted by the simultaneous closing of two synchronizer clutches, with one synchronizer clutch participating in the shifting of all of the transmission gears. This synchronizer clutch is actuated by a servo drive, and the other synchronizer clutches are actuated purely mechanically via a shift roller.

11 Claims, 4 Drawing Sheets

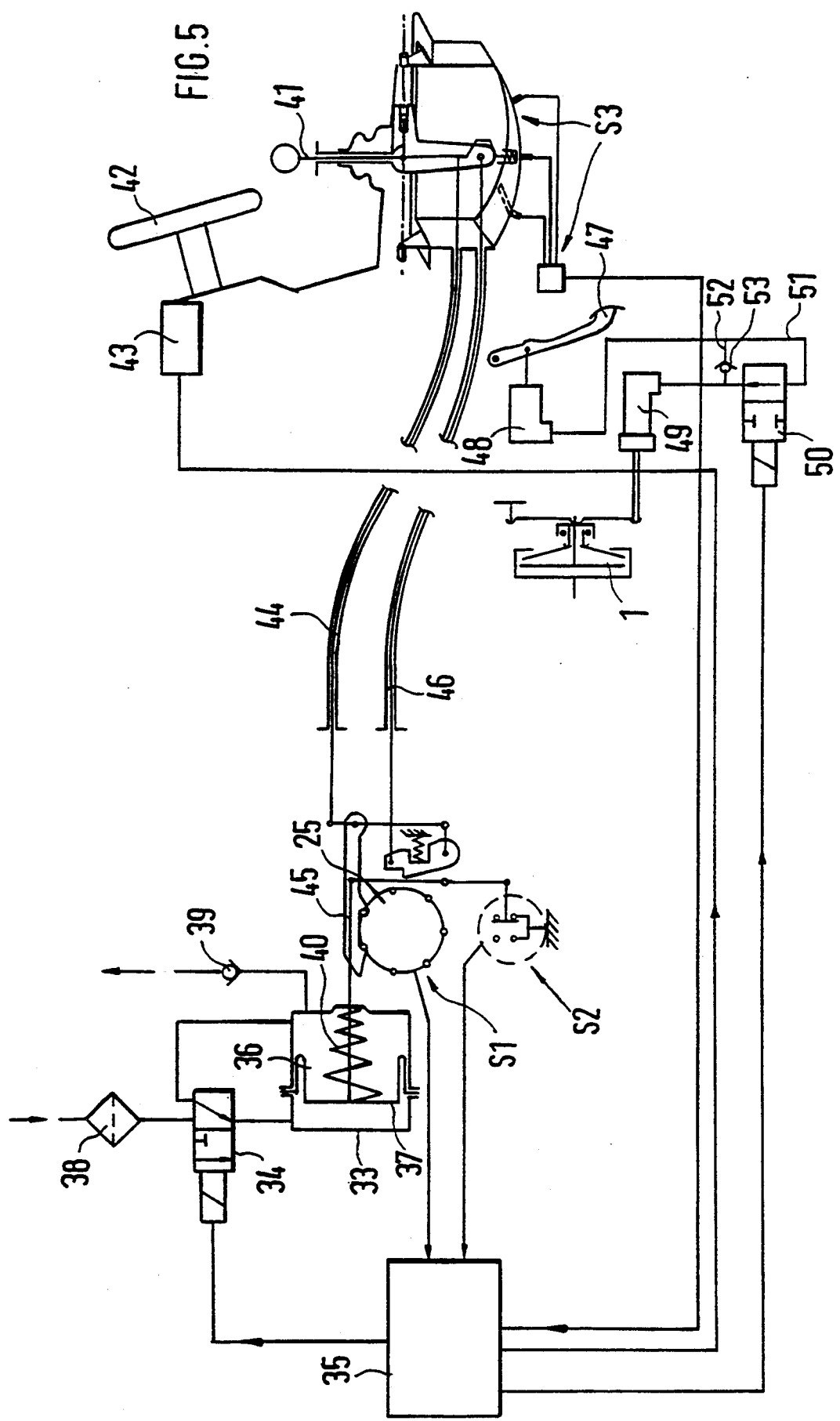

GEAR SHIFT MECHANISM OF A MOTOR VEHICLE TRANSMISSION

BACKGROUND AND SUMMARY OF THE INVENTION

The present invention relates to a gear shift mechanism of a motor vehicle change-speed gearbox having a plurality of transmission gears which are shiftable by synchronizer clutches, with respective pairs of wheels being formed from mutually meshing fixed wheels and loose wheels. The transmission gears are shiftable by the simultaneous closing of two synchronizer clutches by sliding sleeves, with the sliding sleeve of one synchronizer clutch cooperating in the shifting of all of the transmission gears.

In the book with the title "Gearboxes", Johannes Looman, Springer Publishers, Berlin, 1988, Page 10, auxiliary transmissions are described which represent a usually two-speed range transmission connected in front of or behind the normal gear shift transmission. These auxiliary transmissions have the purpose of increasing the number of gears and the transmission range of the transmission by means of the multiple utilization of sets of wheels without increasing the overall length of the transmission.

When this type of synchronized gear shift transmission is constructed in such a manner that the transmission gears can be shifted by a simultaneous closing of two synchronizer clutches, the expenditure of forces becomes quite high in the case of a purely manual operation.

It is an object of the invention to provide a gear shift mechanism for a transmission of the above described type which can be manufactured with low expenditures, and in which the manual shifting forces can clearly be reduced.

This and other objects are achieved by the present invention which provides a gear shift mechanism of a motor vehicle change-speed gearbox that has a plurality of transmission gears, with respective pairs of wheels formed from mutually meshing fixed wheels. The mechanism includes synchronizer clutches that have sliding sleeves, the synchronizer clutches being engageable with the pairs of wheels to shift the transmission gears. The transmission gears are shiftable by the simultaneous closing of two synchronizer clutches via the sliding sleeves. The sliding sleeve of a first synchronizer clutch of the plurality of synchronizer clutches cooperates in the shifting of all of the transmission gears. A servo drive is coupled to the first synchronizer clutch and operates this first synchronizer clutch. The other synchronizer clutch of the plurality of synchronizer clutches are manually operable.

When the one synchronizer clutch, which participates in the shifting of all transmission gears, is actuated by a servo drive, the shifting work to be performed by the driver of the vehicle is clearly reduced. The driver must manually operate only one synchronizer clutch and the shifting work to be carried out by the driver is less than in the case of conventional transmission shifting. Only the rotating transmission parts (rotating mass portion approximately 15%) must be synchronized manually. The servo device takes over the synchronizing of the clutch disk (rotating mass portion approximately 85%).

Additional feature with respect to the shifting technique and construction which further develop a relatively simple servo drive are also provided in embodiments of the invention. In principle, it would also be possible to shift all synchronizer clutches by means of a servo drive. However, the manufacturing costs for such a shift mechanism would be much higher because an expensive control circuit would be required for the reciprocal adaptation of these servo drives.

Other objects, advantages and novel features of the present invention will become apparent from the following detailed description of the invention when considered in conjunction with the accompanying drawings.

BRIEF DESCRIPTION OF THE DRAWINGS

FIG. 5 is a view of a pneumatic-electric wiring diagram for the present invention.

DETAILED DESCRIPTION OF THE DRAWINGS

Figure 1:
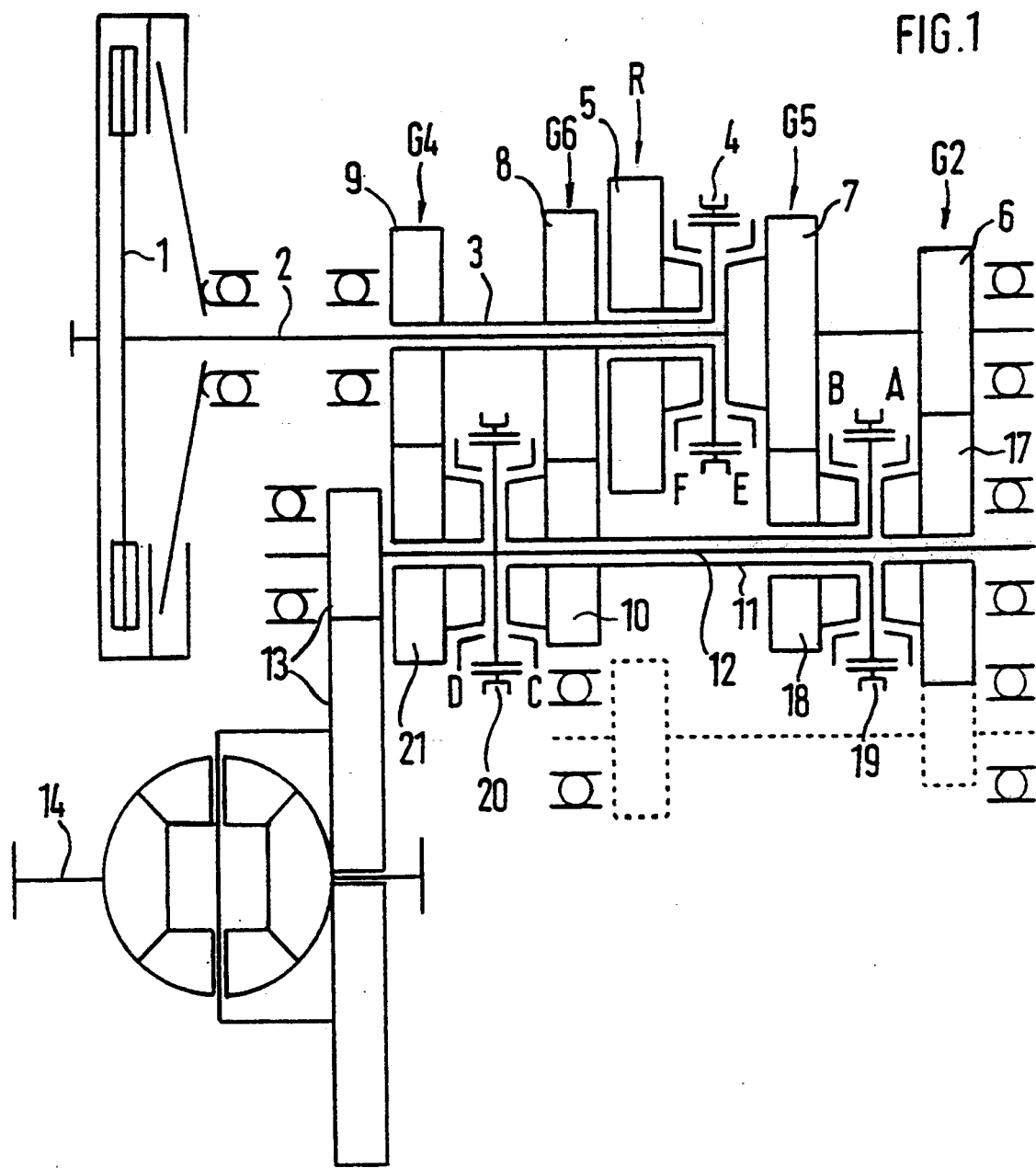
FIG. 1 is a schematic representation of change-speed gearboxes constructed in accordance with an embodiment of the present invention.

Via an engine clutch 1 arranged between a reciprocating engine and the change-speed gearbox, a central input shaft 2 of the change-speed gearbox is driven. On this input shaft 2, a hollow shaft 3 is rotatably disposed and can be connected in a torque-transmitting manner by a clutch E with the input shaft 2. A sliding sleeve 4, which actuates the clutch E, is non-rotatable and longitudinally slidable with respect to the input shaft 2.

By means of the clutch F, the loose wheel 5 of the reverse gear R can be connected with the input shaft 2. The fixed wheel 6 of the second gear G2 and the fixed wheel 7 of the fifth gear G5 are arranged on the input shaft 2. The fixed wheel 8 of the sixth gear G6 and the fixed wheel 9 of the fourth gear G4 are arranged on the hollow shaft 3. A fixed, wheel 10 mating with the fixed wheel 8 is fastened on a second hollow shaft 11 in which an output shaft 12 is disposed in a central manner. A vehicle axle 14 is driven by the output shaft 12 via a front-end pair of wheels 13.

A loose wheel 17 disposed on the hollow shaft 11 mates with the fixed wheel 6 of G2, and a loose wheel 18 which is also disposed on the hollow shaft 11 mates with the fixed wheel 7 of G5. By means of a synchronizer clutch A-B, whose sliding sleeve 19 is non-rotatable with respect to the hollow shaft 11, the loose wheel 17 can be coupled with the hollow shaft 11 by means of clutch A; the loose wheel 18 can be coupled with the hollow shaft 11 by means of clutch B.

By means of another synchronizer clutch C-D, whose sliding sleeve 20 is non-rotatable with respect to the output shaft 12, the hollow shaft 11 can be coupled with the output shaft 12 via clutch C. Via clutch D, a loose wheel 21 which is disposed on the output shaft 12 and which mates with the fixed wheel 9 of G4, can be connected with the output shaft 12.

As illustrated in the following table, for the shifting of all forward gears G1 to G6, two clutches are simultaneously brought into the closing position.

| Gear | Clutches | | A | B | C | D | E | F |
|---|---|---|---|---|---|---|---|---|
| 1. | A | D | X | | | X | | |
| 2. | A | C | X | | X | | | |
| 3. | B | D | | X | | X | | |
| 4. | E | D | | | | X | X | |
| 5. | B | C | | X | X | | | |
| 6. | E | C | | | X | | X | |
| R. | F | D | | | | X | | X |

The synchronizer clutch C-D participates in the shifting of all gears. Since, in its neutral zero position, it results in the idling of the transmission, it is possible to shift from all shifted gears directly into idling and, vice versa, from idling directly into any gear.

Gears G2, G5, G6 and G4 each consist of one pair of wheels. The G1 is formed by wheel pair 6, 17 of G2 and gears G4 and G6 which are connected behind it as an auxiliary transmission. Together with the wheel pair 7, 18, gears G4 and G6 form the third gear G3.

Figure 2:
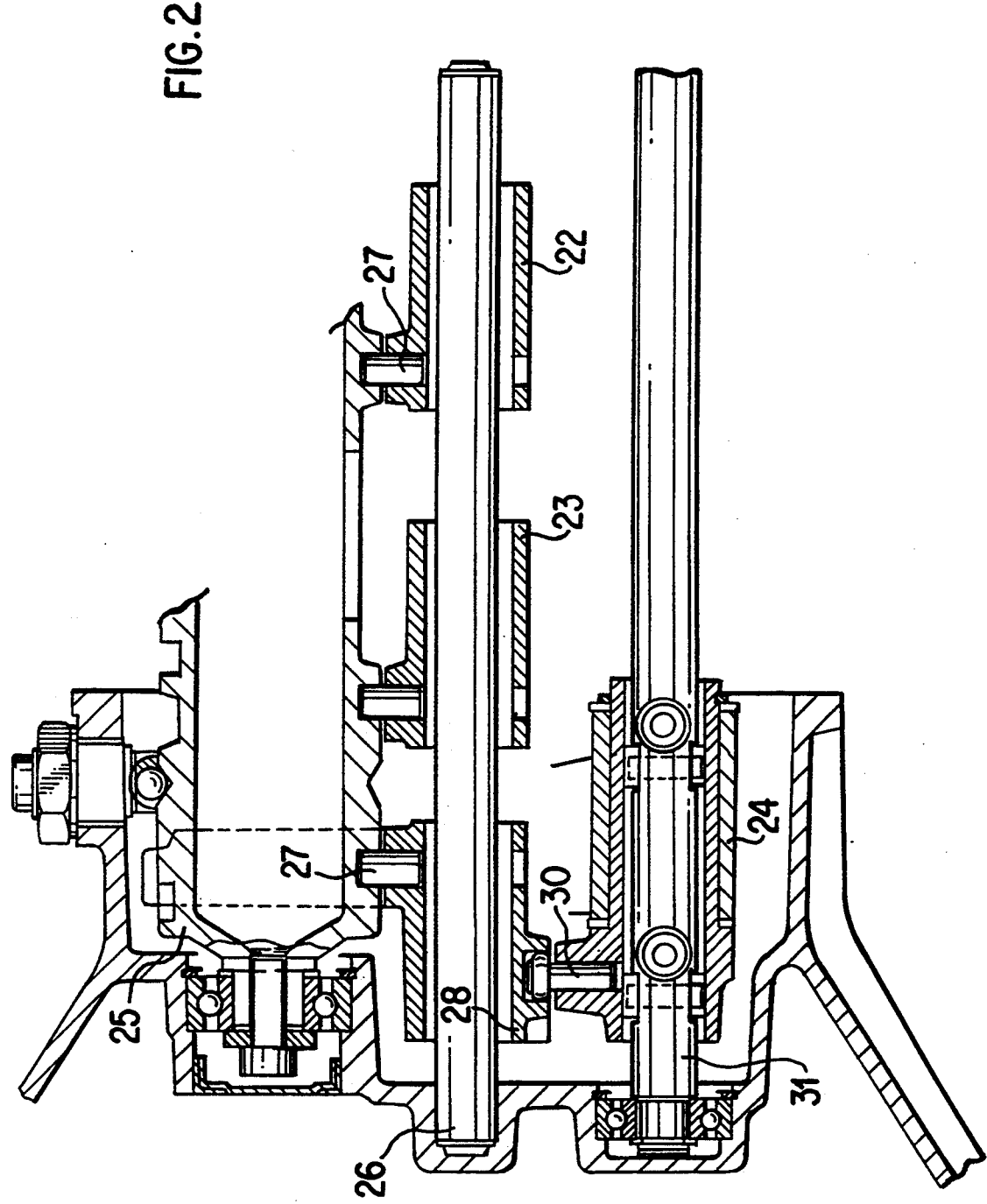
FIG. 2 is a longitudinal sectional view of the shift roller and of the shift rods according to Line II—II of FIG. 3.

As shown in FIGS. 1 and 2, in order to be able to bring the synchronizer clutches into the closing position, the shift forks 22, 23, 24, which are actuated by a shift roller 25, engage in the sliding sleeves 19, 4, 20 of the synchronizer clutches. The shift roller 25 is of conventional construction and causes, by means of curved paths, an axial displacement of the shift forks. The shift forks 22, 23 are longitudinally displaceably disposed on a shaft 26 fixed to the housing and can be displaced by means of the shift roller 25 directly via pins 27. A driving device 28 is disposed on the shaft 26 and can be actuated by the shift roller 25 via a pin 27. A coupling finger 30 engages in a groove 29 of the driving device 28. The coupling finger 30 is fastened to a shaft 31 on which the shift fork 24 is disposed.

Figure 3:
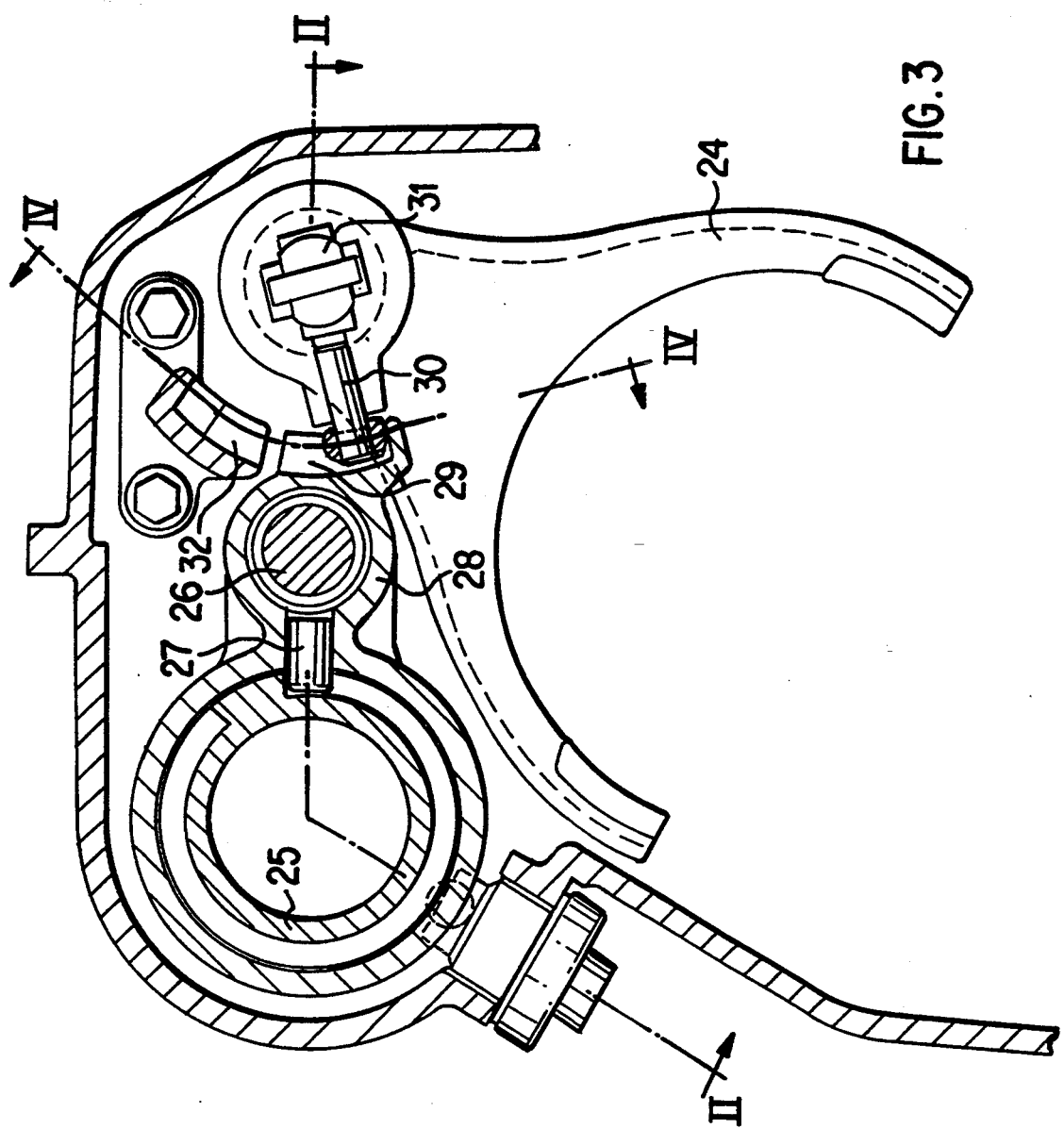
FIG. 3 is a cross-sectional view of the shift roller and of the shift rods.
Figure 4:
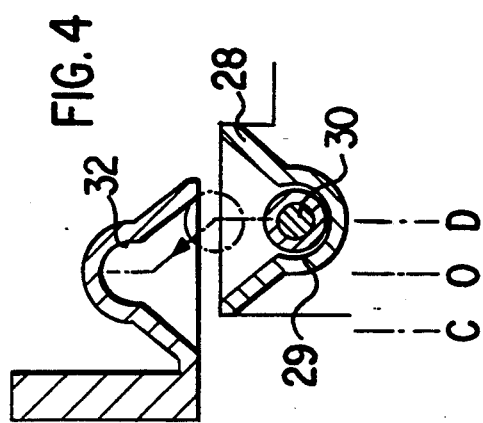
FIG. 4 is a view in plane IV—IV of FIG. 3.

When the synchronizer clutch C-D is to be brought into its center neutral position in order to shift the transmission to idling, the coupling finger 30 is swivelled out of the groove 29 and swivelled into a curved guide 32 fixed to the housing (see FIG. 3). The groove 29 of the driving device 28 as well as the curved guide 32 have V-shaped openings which are directed toward one another. During the swivelling of the coupling finger 30 out of the driving device 28, these openings cause an axial displacement of the synchronizer, clutch C-D into the neutral position. During the swivelling-in of the coupling finger 30, they cause an axial displacement into the shifting position which is in each case determined by the shift roller 25. Thus, while the transmission is in the neutral position (coupling finger swivelled out), any gear may be preselected by rotating the shift roller 25 and may then be shifted by the swivelling-in of the coupling finger 30.

The synchronizer clutch C-D or the shift fork 24 engaging into its sliding sleeve 20 is actuated by means of a pneumatic servo drive whose wiring diagram is illustrated in FIG. 5. The servo drive comprises a pneumatic cylinder 33, a solenoid valve 34 and a control unit 35.

In the pneumatic cylinder 33, an adjusting piston 37, which is connected with the coupling finger 30, is fastened to a rolling membrane 36. The outside air, which was purified in a filter 38, is supplied to the face of the adjusting piston 37 via the solenoid valve 34 controlled by the control unit 35. Via a return valve 39, the back of the adjusting piston 37 is connected to the suction tube vacuum of the reciprocating engine. If the suction pipe vacuum is lower than the pressure of the outside air, the adjusting piston is displaced against the force of the spring 40 which supports it on the bottom of the pneumatic cylinder.

The control unit 35 receives signals from a switch S1 disposed on the shift roller 25, a switch S2 assigned to the adjusting piston 37, and a switch S3 which is arranged on the shift lever 41. The switch S3 supplies contact in the illustrated center position of the shift lever 41 as well as in the two end positions which indicate the + upshift and the − downshift.

Switch S1 reports to the control unit the seven positions of the shift roller 25 for the six forward gears and the R-gear. The display of the gear takes place in a display unit 43, arranged close to the steering wheel 42.

For the mechanical operation, a bowden cable 44 is pivotally linked to the shift lever 41, which bowden cable 44 rotates the shift roller 25 via a draw hook 45. Another bowden cable 46, which is pivotally linked to shift lever 41, is used for the R-gear disengagement.

When the shift lever 41 is moved by the driver out of the center position, the center contact of the switch S3 will open. As a result, the 3/2-solenoid valve 34 is controlled, whereupon the adjusting piston 37 adjusts the synchronization C-D to neutral. By means of a contact change, the switch S2 reports when the position has been reached. During this time, the play in the bowden cable 44 is overcome and the draw hook 45 continues to rotate the shift roller 25 one position further. The switch S1, which is disposed on the shift roller 25, reports when the correct position of the shift roller 25 has been reached. Now, the solenoid valve 34 becomes currentless so that the spring 40 causes the shifting of the synchronization C-D. It is only when the switch S2 closes again that the shifting is completed and the engaged gear is displayed in the display unit 43. Thus, the shifting operation is finished, and the shift lever 41 is moved by means of a spring in the gear shift lever bracket back into the center position.

In addition, the shift lever 41 can be moved out of the center position to the side (neutral position). As a result, the center contact at switch S3 is also left, whereby the synchronizer clutch C-D is adjusted in the neutral position. As the result of the guiding-back of the shift lever 41 into the center position, the last engaged gear is engaged again because the shift roller 25 has not changed the position.

It is also conceivable to permit the shifting from the neutral position so that the driver can preselect any gear by means of which he can continue to drive after returning, into the center position. This takes place, for example, in front of a traffic light when a downshifting takes place from the fifth to the first gear.

The engine clutch 1 is hydraulically actuated by means of the clutch pedal 47 via an input cylinder 48 and an output cylinder 49. An additional output on the control unit 35 may take over a protection during the reengagement in that a 2/2 solenoid valve 50 in the hydraulic pipe 51 is controlled between the input cylinder 48 and the output cylinder 49. A return valve 53 arranged in a parallel line 52 makes it possible that the engine clutch 1 can be opened at any time. During the shifting operation, the solenoid valve 50 is controlled so that the reengagement cannot take place before the shifting operation is concluded.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A gear shift mechanism of a motor vehicle having a change-speed gearbox that has a plurality of transmission gears, with respective pairs of gearwheels, comprising:

synchronizer clutches having sliding sleeves and engageable with the pairs of gearwheels to shift the transmission gears, the transmission gears being shiftable by the simultaneous closing of two synchronizer clutches via the sliding sleeves, wherein the sliding sleeve of a first synchronizer clutch of the plurality of synchronizer clutches cooperates in the shifting of all of the transmission gears;

a servo drive coupled to the first synchronizer clutch which operates the first synchronizer clutch, wherein the other synchronizer clutches of the plurality of synchronizer clutches are manually operable.

2. A gear shift mechanism according to claim 1, further comprising shift forks that engage in the sliding sleeves of the respective synchronizer clutches, and a shift roller that operates the shift forks, a first one of the shift forks which engages in the sliding sleeve of the first synchronizer clutch being capable of being uncoupled from the shift roller and bringing the sliding sleeve into a neutral position.

3. A gear shift mechanism according to claim 2, further comprising a driving device that connects the shift fork with the shift roller, and a coupling finger releasably connected with the first shift fork, the coupling finger being actuated by the servo drive.

4. A gear shift mechanism according to claim 3, wherein the servo drive is arranged to bring the sliding sleeve of the first synchronizer clutch into an opening position before the shift roller is rotated manually and into a closing position after the shift roller has reached a desired new position.

5. A gear shift mechanism according to claim 4, wherein a synchronizing operation for all transmission gears to be shifted is carried out through the first synchronizer clutch and thus by the servo drive.

6. A gear shift mechanism according to claim 5, wherein the servo drive is at least one of a pneumatic, electric or hydraulic servo drive.

7. A gear shift mechanism according to claim 1, wherein a servo system includes the servo drive, a pneumatic cylinder, a solenoid valve and a control unit.

8. A gear shift mechanism according to claim 7, wherein the pneumatic cylinder has a longitudinally movable adjusting piston arranged inside the pneumatic cylinder under spring prestress, outside air being guidable via the solenoid valve to a face of the adjusting piston, with the back of the adjusting piston via a return valve being connectable to a suction pipe vacuum of a reciprocating piston driving the motor vehicle.

9. A gear shift mechanism according to claim 7, further comprising a first switch mounted on a shift lever of the gear shift mechanism, a second switch mounted on an adjusting piston and a third switch mounted on a shift roller, and an electronic control unit coupled to receive signals from each of the switches, the electronic control unit controlling the solenoid valve in response to the signals received from the switches.

10. A gear shift mechanism for a reciprocating engine of the motor vehicle according to claim 1, further comprising an engine clutch arranged between the reciprocating engine of the motor vehicle and the change speed gearbox, an input cylinder and an output cylinder hydraulically coupled to actuate the engine clutch, the input cylinder, which is actuated by a clutch pedal, being connected with a non-return valve via a first line and with an installed solenoid valve via a second parallel line being connected to the output cylinder which actuates the engine clutch.

11. A gear shift mechanism according to claim 9, wherein the solenoid valve is controlled by means of the control unit such that, for protection against misuse, the engaging of an engine clutch is prevented as long as the second switch does not signal a correct position of a coupling finger.

* * * * *